United States Patent [19]
Thomas et al.

[11] Patent Number: 6,078,392
[45] Date of Patent: *Jun. 20, 2000

[54] DIRECT-TO-DIGITAL HOLOGRAPHY AND HOLOVISION

[75] Inventors: Clarence E. Thomas; Larry R. Baylor, both of Knoxville; Gregory R. Hanson, Clinton; David A. Rasmussen, Knoxville; Edgar Voelkl, Oak Ridge, all of Tenn.; James Castracane, Albany, N.Y.; Michelle Simkulet, Latham, N.Y.; Lawrence Clow, Waterford, N.Y.

[73] Assignee: Lockheed Martin Energy Research Corp., Oak Ridge, Tenn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/873,252

[22] Filed: Jun. 11, 1997

[51] Int. Cl.⁷ ........................................ G01B 9/02
[52] U.S. Cl. ............................ 356/348; 356/349
[58] Field of Search .................... 356/359, 360, 356/347, 348, 349

[56] References Cited

U.S. PATENT DOCUMENTS

| 4,094,011 | 6/1978 | Nagao . | |
|---|---|---|---|
| 4,812,042 | 3/1989 | Yokokora et al. | 356/348 |
| 5,299,035 | 3/1994 | Leith et al. | 359/9 |
| 5,515,183 | 5/1996 | Hashimoto . | |

FOREIGN PATENT DOCUMENTS

| 6-282213 | 7/1994 | Japan | G03H 1/08 |

OTHER PUBLICATIONS

International search report form PCT/US98/11947.
Invention of Holography: D. Gabor, Proc. Roy. Soc. London Ser. A A197, 459 (1949).
Invention of sideband(hetrodyne) holography: E. Leith and J. Upatnieks, J. Opt. Soc. Am. 52, 1123 (1962) and J. Opt. Soc. Am. 53 1377 (1963).
Mathematical treatise on holography: J.B. Develis and G.O. Reynolds, *Theory and Application of Holography*, Addison–Wesley, Reading MA, 1967.
Invention of holographic interferometry: L.O. Heflinger, R.F. Wuerker, and R.E. Brooks, J. Appl. Phys. 37, 642 (1966).
Discussion of focused holography (used for holographic interferometry): F.C. Jahoda, R.A. Jeffries, and G.A. Sawyer, Appl. Opt. 6, 1407 (1967).
*Holographic Interferometry Cookbook*, F.C. Jahoda and R.E. Siemon, LA–5058–MS Informal Report UC–37, Los Alamos Scientific Laboratory, Los Alamos, New Mexico, (1972).
*Interferogram Analaysis: Digital Fringe Pattern Measurement Techniques*, M. Kujawinska,(edited by D.W. Robinson and G.T. Reid), IOP Publishing Ltd., Bristol, England, 1993.
*Holographic Interferometry; Principles and Methods*, K. Creath and T. Kreis (edited by K. Rastogi), New York, 1994.

(List continued on next page.)

*Primary Examiner*—Robert H. Kim
*Attorney, Agent, or Firm*—Wilson, Sonsini, Goodrich & Rosati

[57] ABSTRACT

Systems and methods for direct-to-digital holography are described. An apparatus includes a laser; a beamsplitter optically coupled to the laser; a reference beam mirror optically coupled to the beamsplitter; an object optically coupled to the beamsplitter, a focusing lens optically coupled to both the reference beam mirror and the object; and a digital recorder optically coupled to the focusing lens. A reference beam is incident upon the reference beam mirror at a non-normal angle, and the reference beam and an object beam are focused by the focusing lens at a focal plane of the digital recorder to form an image. The systems and methods provide advantages in that computer assisted holographic measurements can be made.

20 Claims, 13 Drawing Sheets

OTHER PUBLICATIONS

Papers by E. Voelkl on Fourier transform analysis of electron holography: E. Voelkl, L.F. Allard, and B. Frost, J. Microscopy 180, pt. 1, Oct., 1995, pp. 39–50.

E. Voelkl, L.F. Allard, A.Datye, B. Frost, Ultramicroscopy 58, (1995), pp. 97–103.

E. Voelkl and L.F. Allard, ICEM–13 (13'th International Conference on Electron Microscopy), 17–22, Jul., 1994, Paris, France, Proceedings, p. 287.

Shepherd, C., "The World of Holography by Charles Shepherd", from World Wide Web site "http://gate.cks.com/~vader/hogb.html", printed Sep. 13, 1997, 7 pages.

St.–Hilaire, P., "Scalable Optical Architectures for Electronic Holography", submitted to the Program in Media Arts and Sciences, School of Architecture and Planning, MIT, Jun. 23, 1994, 1 page abstract.

"Holographic 3D Television", from World Wide Web site "http://panda.ecs.cst.nihon–u.ac.jp/oyl/Eholo/home.e.html", printed Sep. 13, 1997, 1 page.

St.–Hilaire, "Holographic Video — The ultimate visual interface?", Optics & Photonics News, vol. 8, No. 8, Aug. 1997, pp. 35–36.

"Practical Holography VIII", SPIE Proceedings vol. 2176, Meeting date Feb. 6–10, 1994, San Jose, CA, published 1994, Stephen A. Benton, Editor, (MIT), printed from World Wide Web site "http://www.spie.org/web/abstracts/2100/2176.html" on Sep. 13, 1997, 18 pages of abstracts.

DIRECT-TO-DIGITAL HOLOGRAPHY AND HOLOVISION

STATEMENT AS TO RIGHTS TO INVENTIONS MADE UNDER FEDERALLY-SPONSORED RESEARCH AND DEVELOPMENT

This invention was made with United States government support awarded by the United States Department of Energy under contract to Lockheed Martin Energy Research Corporation. The United States has certain rights in this invention.

BACKGROUND OF THE INVENTION

1. Field of the Invention

The present invention relates generally to the field of holography. More particularly, the present invention relates to a direct-to-digital hologram acquisition and replay system (i.e., no film, no plates). In a preferred implementation of the present invention, the hologram acquisition is based on a charge coupled device (CCD) camera. The present invention thus relates to a holographic system.

2. Discussion of the Related Art

Traditional methods of holography have used film or holographic plates (glass plates with a photographic emulsion optimized for holography) to record the hologram.[1] Replay has only been possible using lasers (or in some cases white light) and the original recorded hologram or a duplicate of it, in an analog method. These analog methods are slow, cumbersome, and expensive.[4] There is also no way to reduce them to electronic signals that can be transmitted and replayed at another location. It is always necessary to send hard copy. Worse still, the time delay involved in processing the film prevents the use of holography and its variants in many situations. Even if the expense of the classical holographic system itself was tolerable, the time delay and low throughput caused by the necessity of processing the film, introduces expenses associated with the delay that are absolutely intolerable (e.g., a tire manufacturer cannot wait 45 minutes, or even two minutes, to know that a particular tire has a flaw in it).

Referring to FIG. 1, a classical side-band holography system recordation geometry is shown.[2-3] Light from a laser 110 is expended by a beam expander 120. After passing through a lens 130, the light is split into two components by a beamsplitter 140. The beamsplitter 140 can be, for example, 90% reflective. The reflected beam constituting an object beam 150 travels toward and is reflected by a mirror 160. The object beam 150 then travels toward an object 170. The object beam 150 is then incident upon a holographic plate 190.

Meanwhile, that portion of the light from lens 130 that is transmitted through the beamsplitter 140 constitutes a reference beam 180 that travels toward and is reflected by a mirror 200. The reflected reference beam is then incident upon the holographic plate 190.

More recently, holographic interferometry has been developed, albeit also as an analog method.[5] This has included the development of focussed holography.[6-7]

Within this application several publications are referenced by superscripts composed of arabic numerals within parentheses. Full citations for these, and other, publications may be found at the end of the specification immediately preceding the claims. The disclosures of all these publications in their entireties are hereby expressly incorporated by reference into the present application for the purposes of indicating the background of the present invention and illustrating the state of the art.

SUMMARY OF THE INVENTION

Therefore, there is a particular need for a method for 1) recording holograms directly to a CCD (charged coupled device) camera or any other suitable video camera with a digital computer interface and then 2) storing the holograms to a digital storage medium (e.g., RAM, hard drive, tape, recordable CD, etc.). Significant features of an apparatus for implementing this method include the use of a very small angle between the reference beam and object beam and focusing the hologram on the image plane to simplify the image. Additionally, the invention includes 1) a method of displaying the hologram phase or amplitude on a two-dimensional display and 2) a method of replaying the holograms completely using an optically active crystal and lasers. In contrast, the prior art does not include a description of how to electronically (digitally) record an optical hologram, much less replay, or broadcast an optical hologram.

These, and other, aspects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the components and operation of model systems provided with the present invention, will become more readily apparent by referring to the exemplary, and therefore nonlimiting, embodiments illustrated in the drawings accompanying and forming a part of this specification, wherein like reference numerals designate the same elements in the several views. It should be noted that the features illustrated in the drawings are not necessarily drawn to scale.

DESCRIPTION OF PREFERRED EMBODIMENTS

The present invention and the various features and advantageous details thereof are explained more fully with reference to the nonlimiting embodiments that are illustrated in the accompanying drawings and detailed in the following description. Descriptions of well known components and processing techniques are omitted so as to not unnecessarily obscure the present invention in detail.

1. System Overview

The reason that digital holography has not been developed until now is that the resolution of digital video cameras or cameras adaptable to digital media has, heretofore, not been good enough to record the very high spatial frequencies inherent in classical holograms. The invention combines several techniques that overcome this difficulty, and allow recording of holograms and all of their spatial frequencies up to the inherent holographic resolution of the recording camera for Fourier transform hologram analysis.

It was necessary to realize how to digitally record an optical hologram (and that it is a hologram). It was also necessary to realize that the Fourier transform techniques used in interferometry and electron holography could be used to analyze the hologram. It was also necessary to realize that mathematical addition of a plane wave to the digital hologram, and writing the resulting intensity function to an optically sensitive crystal would allow actual replay of the hologram at a different (and much larger) diffraction angle $\alpha$, than the angle used to create the original sideband hologram.

2. Detailed Description of Preferred Embodiments

Figure 2:
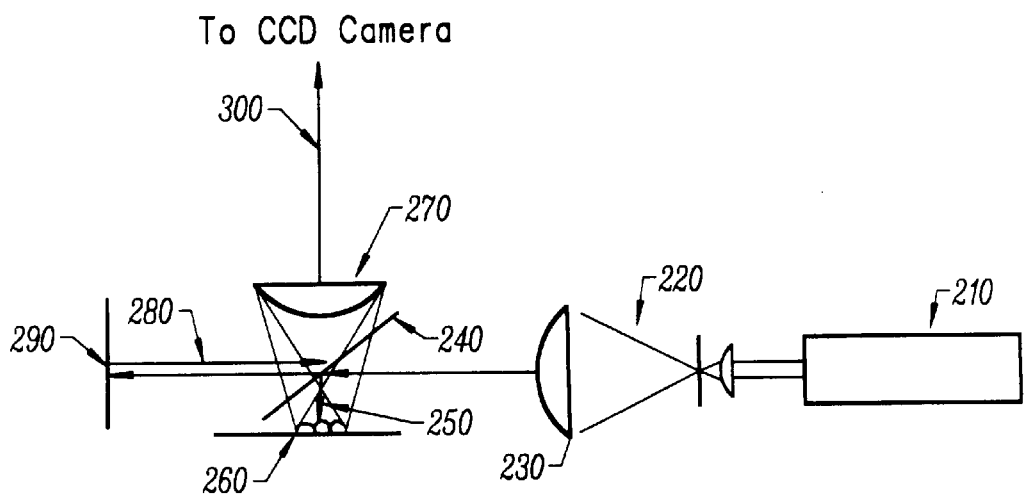
FIG. 2 illustrates a schematic view of a simple direct-to-digital holography system, representing an embodiment of the present invention.

Referring now to FIG. 2, a simple direct-to-digital holography system is shown to illustrate the hardware concepts that have been combined to allow digital recording and replay of holograms. Light from a laser 210 is expanded by a beam expander/spatial filter 220. The expanded/filtered light then travels through a lens 230. Then, the light travels to a beamsplitter 240. Beamsplitter 240 can be, for example, 50% reflective. Light that is reflected by the beamsplitter constitutes an object beam 250 which travels toward and object 260. A portion of the light reflected from the object 260 then passes through the beamsplitter 240 and travels toward a focusing lens 270. This light then travels to a charged coupled device (CCD) camera (not shown).

Meanwhile, that portion of the light from lens 230 that passes through beamsplitter 240 constitutes a reference beam 280. The reference beam 280 is reflected from a mirror 290 at a small angle. The reflected reference beam from mirror 290 then travels toward the beamsplitter 240. That portion of the reflected reference beam that is reflected by the beamsplitter 240 then travels toward the focusing lens 270. The reference beam from focusing lens 270 then travels toward the CCD camera. Together, the object beam from the focusing lens 270 and the reference beam from the focusing lens 270 constitute a plurality of simultaneous reference and object waves 300.

Figure 1:
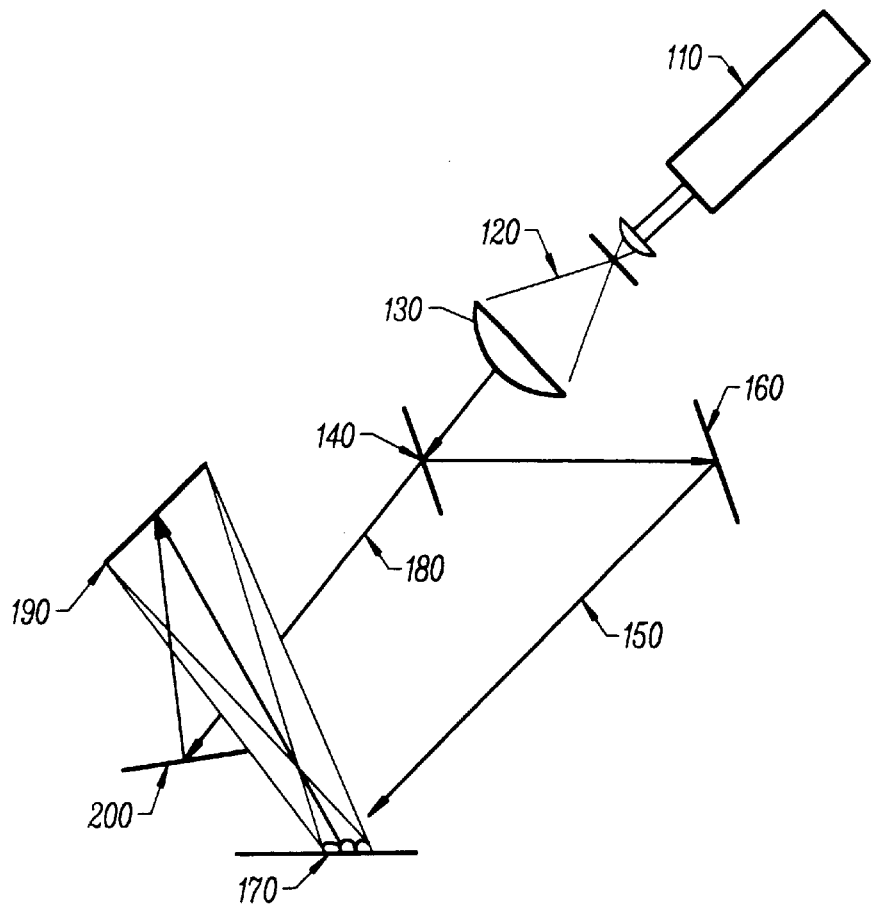
FIG. 1 illustrates a schematic view of a classical (Leith & Upatnieks) sideband holography system appropriately labeled "PRIOR ART"

Comparing FIG. 2 to FIG. 1, it can be seen that at least the following differences allow a CCD camera to record the hologram, rather than using film or a photographic plate. 1) The invention uses a high resolution CCD (e.g., 1.4 million pixels), (CCD's with over 60 million pixels are already available). 2) The invention uses a "Michelson" geometry (the geometrical relationship of the beamsplitter, reference beam mirror, and CCD resembles a Michelson interferometer geometry). This geometry allows the reference beam and the object beam to be combined at a very small angle (the reference beam mirror is tilted to create the small angle that makes the spatially heterodyne or sideband fringes for Fourier analysis of the hologram). 3) The invention uses a focusing lens to focus the object onto the focal plane of the CCD. This lens also provides magnification or demagnification, as desired, by using lenses of different focal length and adjusting the corresponding spatial geometry (e.g., ratio of object distance to image distance). The foregoing three factors allow direct to digital recording and replay of holograms when combined with Fourier transform software analysis methods known in the literature.[10-12]

The system is suitable for recording and replaying holographic images in real time or storing them for replay later. Since the holograms are digitally stored, a series of holograms can be made to create a holographic motion picture or the holograms can be broadcast electronically for replay at a remote site to provide holographic television (HoloVision). Since a hologram stores amplitude and phase, with phase being directly proportional to wavelength and optical path length, this direct to digital holography can also serve as an extremely precise measurement tool for verifying shapes and dimensions of precision components, assemblies, etc. Similarly, the ability to store the holograms digitally immediately provides a method for digital holographic interferometry. Holograms of the same object, after some physical change (stress, temperature, micromachining, etc.), can be subtracted from one another (direct subtraction of phase) to calculate a physical measurement of the change (phase change being directly proportional to wavelength). Similarly one object can be compared to a like object to measure the deviations of the second object from the first or master object, by subtracting their respective holograms. To unambiguously measure phase changes greater than $2\pi$ in the z-plane over two pixels in the x-y plane, holograms must be recorded at more than one wavelength (discussions of two-frequency interferometry are well-known in the literature and will not be repeated here).

The invention combines the use of high resolution video cameras, very small angle mixing of the holographic object and reference waves (mixing at an angle that results in at least two pixels per fringe and at least two fringes per spatial feature to be resolved), imaging of the object at the recording (camera) plane, and Fourier transform analysis of the spatially low-frequency heterodyne (side-band) hologram to make it possible to record holographic images (images with both the phase and amplitude recorded for every pixel). Additionally, an aperture stop can be used in the back focal plane of one or more lenses involved in focusing the object, to prevent aliasing of any frequencies higher than can be resolved by the imaging system (aliasing is thoroughly described in the literature and placing aperture stops in the back focal plane of a lens to limit the spatial frequencies present is also well described and well understood). No aperture is necessary if all spatial frequencies in the object are resolvable by the imaging system. Once recorded, it is possible to either replay the holographic images as 3-D phase or amplitude plots on a two-dimensional display or to replay the complete original recorded wave using a phase change crystal and white light or laser light to replay the original image. The original image is replayed by writing it in the phase-change medium with lasers, and either white light or another laser is used to replay it. By recording an image with three different colors of laser and combining the replayed images, it is possible to make a true-color hologram. By continuously writing and replaying a series of images, it is possible to form holographic motion pictures. Since these images are digitally recorded, they can also be broadcast with radio frequency (RF) waves (e.g., microwave) or over a digital network of fibers or cables using suitable digital encoding technology, and replayed at a remote site. This effectively allows holographic television and motion pictures or "HoloVision."

With regard to the use of a lens to focus the object onto the focal plane of the CCD, the diffraction pattern of a point can be described by a spherical function which has increasingly close fringe as the distance from the center of the pattern increases. As these fringes get closer and closer together, they are unresolvable by a video camera. Worse yet, the interaction of these point diffraction patterns from a complex object creates an impossibly dense and complicated pattern, which cannot be anywhere resolved by a video camera. Focusing the object on the recording plane eliminates these diffraction patterns, so that modern high-resolution video cameras can record holograms with reasonable fidelity.

If the recording media resolves 100 lines/mm, the holographic resolution will be approximately 16 lines/mm, or on the order of 50 microns, at unity magnification. This limit can be increased by the use of a magnification lens. For a camera resolution of 100 lines/mm, the hologram resolution will be approximately 160 lines/mm if a magnification of 10 is used. Similarly, the spatial resolution will be decreased by any de-magnification of the original image onto the recording camera.

The invention can also be embodied in a number of alternative approaches. For instance, the invention can use phase shifting rather than heterodyne acquisition of the hologram phase and amplitude for each pixel. Phase shifting interferometry is well documented in the literature. As another example, the invention can use numerous different methods of writing the intensity pattern to an optically sensitive crystal. These include using a sharply focused scanning laser beam (rather than using a spatial light modulator), writing with an spatial light modulator (SLM) but without the biasing laser beam, and many possible geometric variations of the writing scheme. As another example, the invention can use optically sensitive crystals employing optical effects other than phase change to create the diffraction grating to replay the hologram. As yet another example, the invention can actually use a very fine-pixeled spatial light modulator to create the intensity pattern, thereby obviating any need to write the intensity pattern to an optically active crystal for replaying the hologram.

EXAMPLE

A specific embodiment of the present invention will now be further described by the following, nonlimiting example which will serve to illustrate in some detail various features of significance. The example is intended merely to facilitate an understanding of ways in which the present invention may be practiced and to further enable those of skill in the art to practice the present invention. Accordingly, the example should not be construed as limiting the scope of the present invention.

Figure 3A:
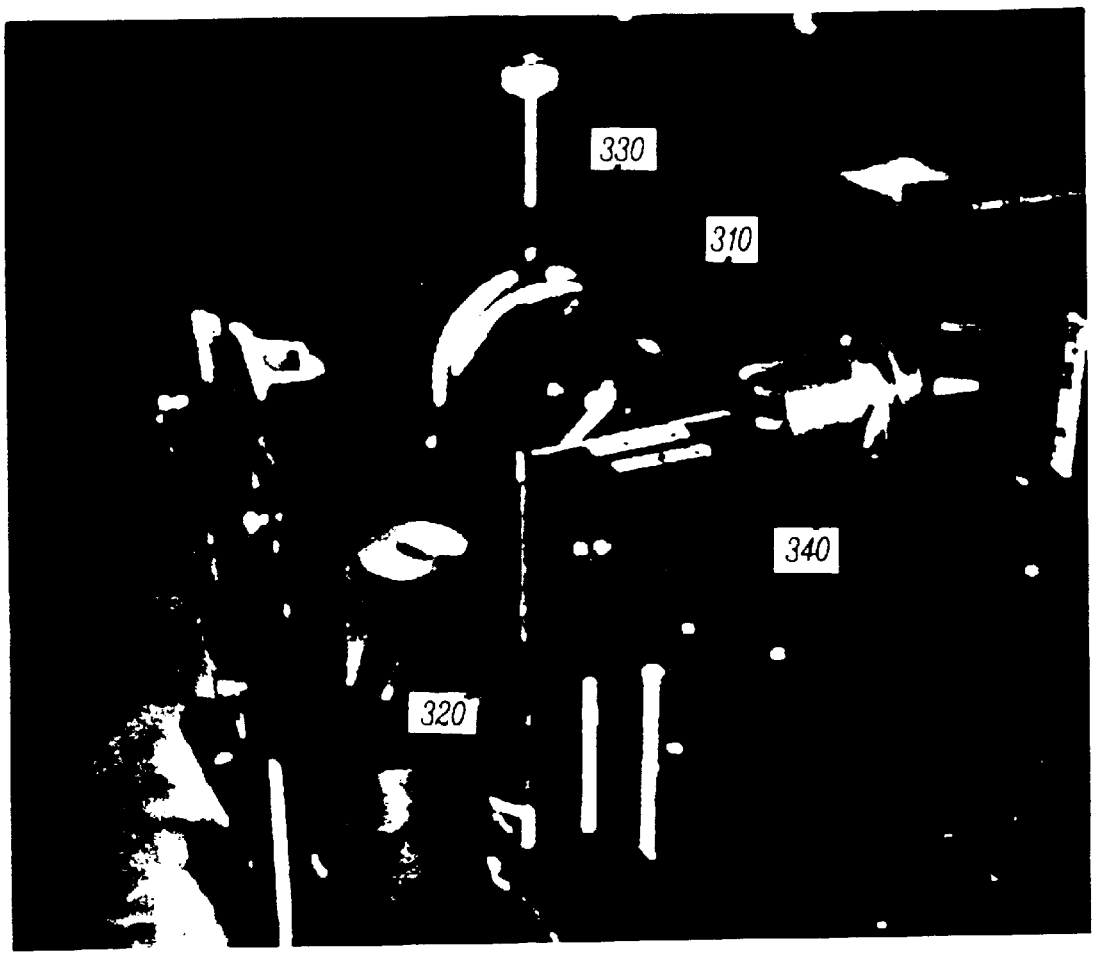
FIG. 3a illustrates a perspective view of a "Michelson" geometry direct-to-digital holography setup, representing an embodiment of the present invention.

FIG. 3A is a perspective view of an exemplary "Michelson" geometry for direct-to-digital holography is shown. Laser light is provided to a beamsplitter 310. An object beam from the beamsplitter 310 travels to a semiconductor wafer mount 320 and then to a focusing lens 330. Meanwhile, a reference beam from the beamsplitter 310 travels to a reference beam mirror that is mounted on a piezoelectric reference beam mirror mount 340.

Figure 3B:
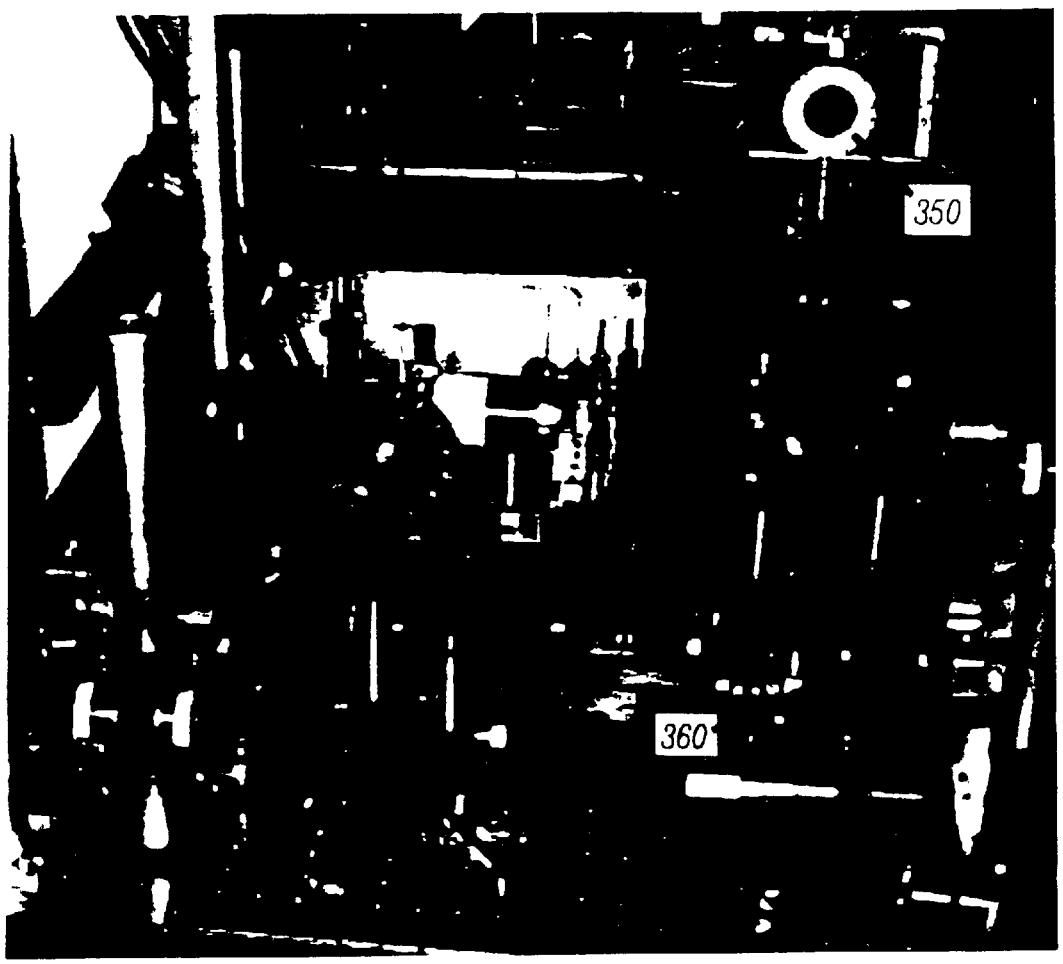
FIG. 3b illustrates another perspective view of the direct-to-digital holography setup shown in FIG. 3A.

FIG. 3B is another perspective view of the exemplary recording "Michelson" geometry is shown. In this view, the position of a direct-to-digital CCD camera 350 with regard to the other subcomponents of the apparatus can be more readily appreciated. In this view, the position of an object target mount 360 can also be more readily appreciated.

Figure 4:
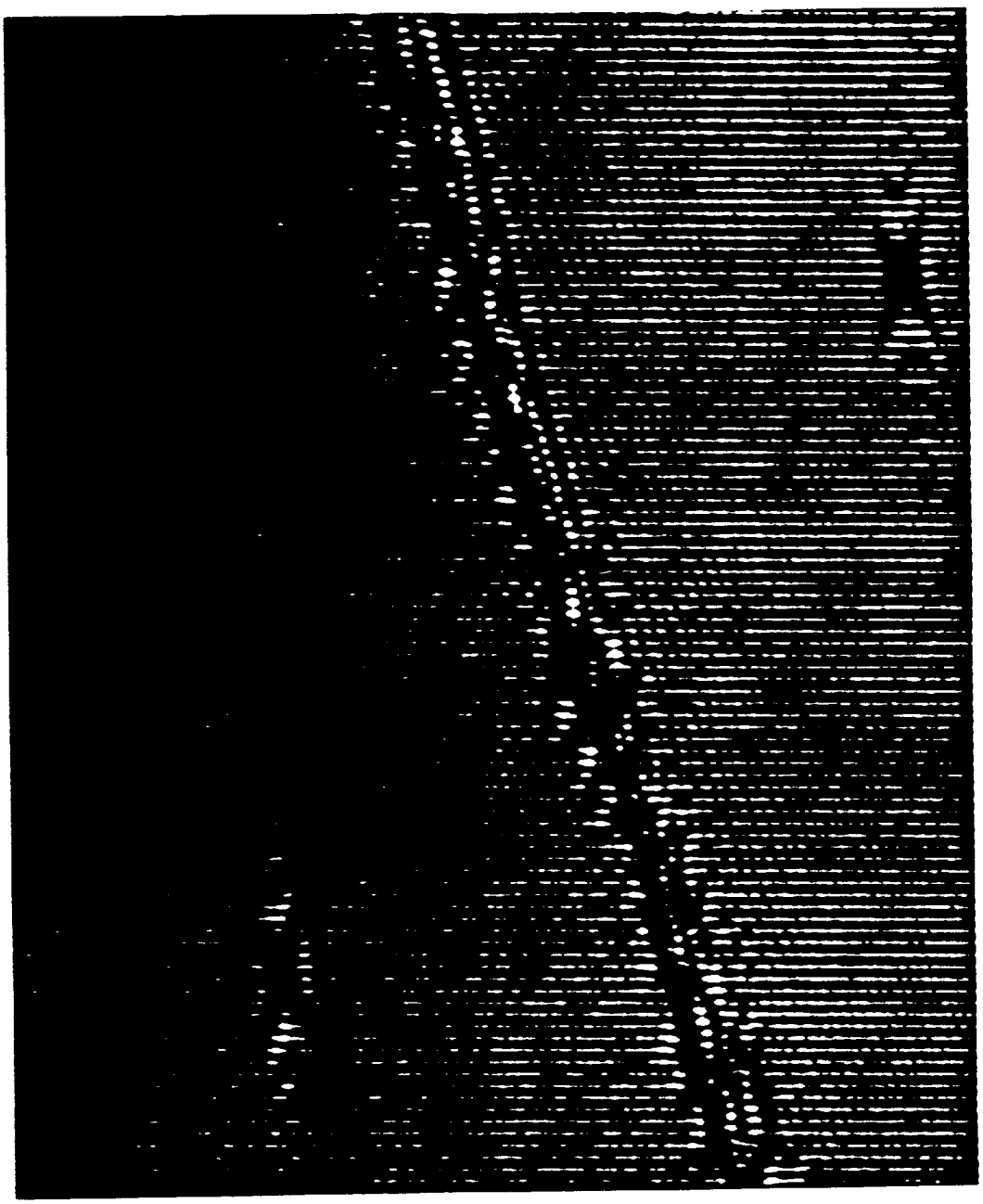
FIG. 4 illustrates a digitally acquired hologram of a scratch in a mirror, representing an embodiment of the present invention.

FIG. 4 is a heterodyne (sideband) hologram of a scratch in a mirror (the object in this case). The hologram was made with the direct to digital holography system illustrated in FIGS. 3A–3B and described above. The fringes observable in the hologram are due to the interference between the reference and object beams. The reference beam mirror was tilted slightly to create these fringes. It is the presence of these fringes which allows Fourier transform analysis of the hologram to calculate the phase and amplitude for the pixels of the hologram. The Fourier transform analysis will be discussed in more detail below.

Figure 5:
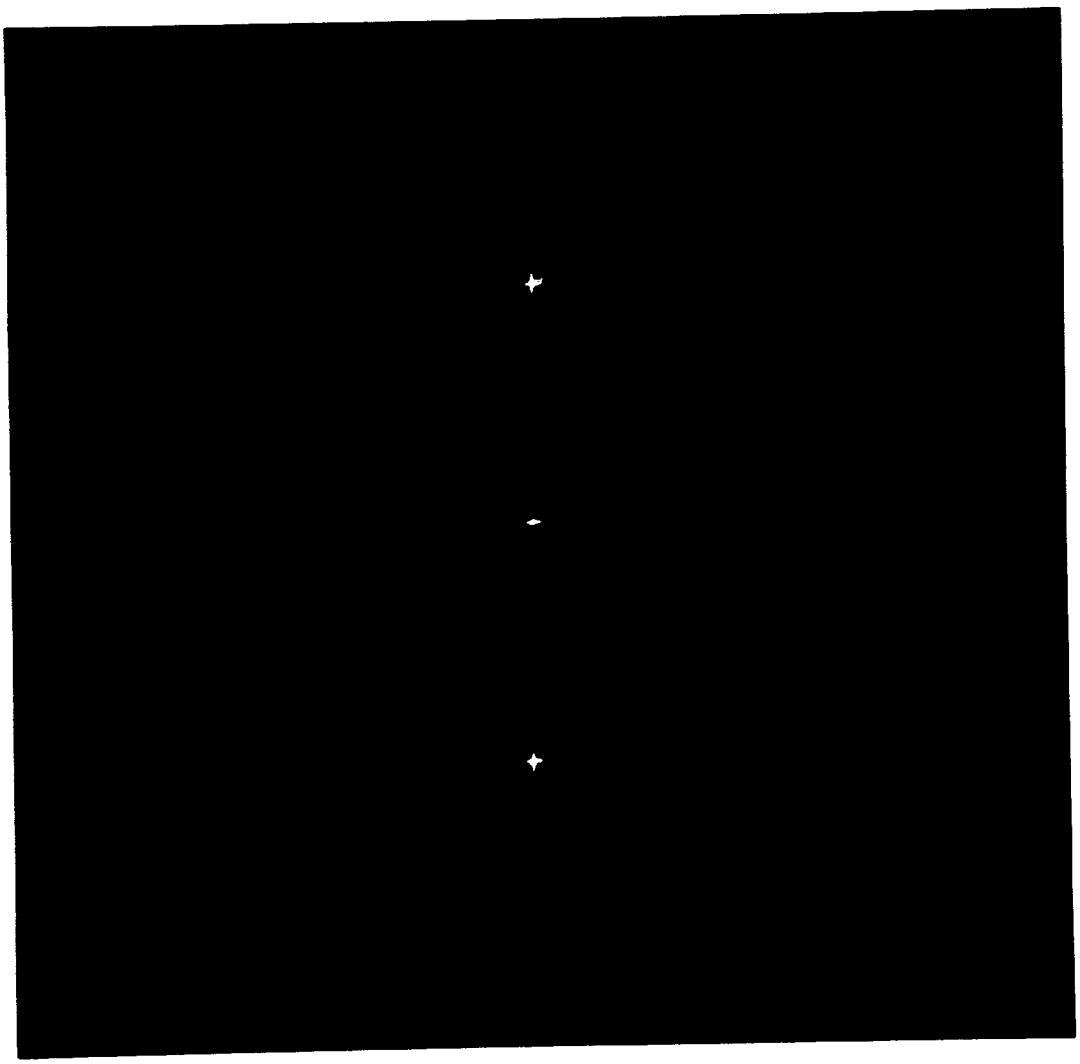
FIG. 5 illustrates a plot of a 2-D Fourier transform of FIG. 4.

FIG. 5 is a graphical plot of the two-dimensional Fourier transform of FIG. 4. The x axis is the spatial frequency axis along the x dimension and the y axis is the spatial frequency axis along the y dimension. The actual data itself is a matrix of numbers corresponding to the strength of a particular spatial frequency in ($f_x$, $f_y$) frequency space. The number and brightness of the white dots shows the strength and position in frequency space of the spatial frequencies present in FIG. 4. It can be appreciated from FIG. 5 that the reference beam fringes act as a heterodyne local oscillator shifting the real and virtual hologram images off-axis and allowing their separation in frequency space. It is known from Shannon's Theorem (or Nyquist's limit) that at least two pixels per fringe are required to resolve a fringe, and from electron holography that at least 3 fringes per resolvable feature are required to resolve the object in the hologram (nominally it would require three to four fringes per feature to allow resolution of the carrier spatial frequency plus the object frequencies, but work on the extended Fourier transform by Voelkl, et. al.,[10-12] allows the use of 2 fringes per feature). Thus, these two limits determine the required magnification of an object and the tilt angle between the reference and object beams in order to resolve a feature (spatial frequency) in a hologram.

The data shown in FIG. 5 is analyzed by transforming (shifting) the axes in Fourier space to sit on top of the heterodyne carrier frequency (the spatial frequency caused by the small angle tilt between the object and reference beams), then applying a digital filter (e.g., a Hanning or Butterworth filter) to cut off the signals around the original origin (these are actually the signals resulting from the reference beam interacting with itself and the object beam interacting with itself, and are just noise from the hologram point of view), and then performing the inverse Fourier transform. All of this analysis can be carried out on a digital computer and can be done in real time. Real time analysis may require as many as 30 to 100 high performance parallel processors (e.g., Pentium Pro or DEC Alpha) to achieve a frame rate of 30 frames per second. Computer systems of this size are presently commonly used as large database servers and stock market calculational engines. They are also suitable for short-term low resolution weather forecasting, and image manipulation and creation for the film industry. It can be expected that such systems will be desktop systems within 6 to 10 years.

Figure 6:
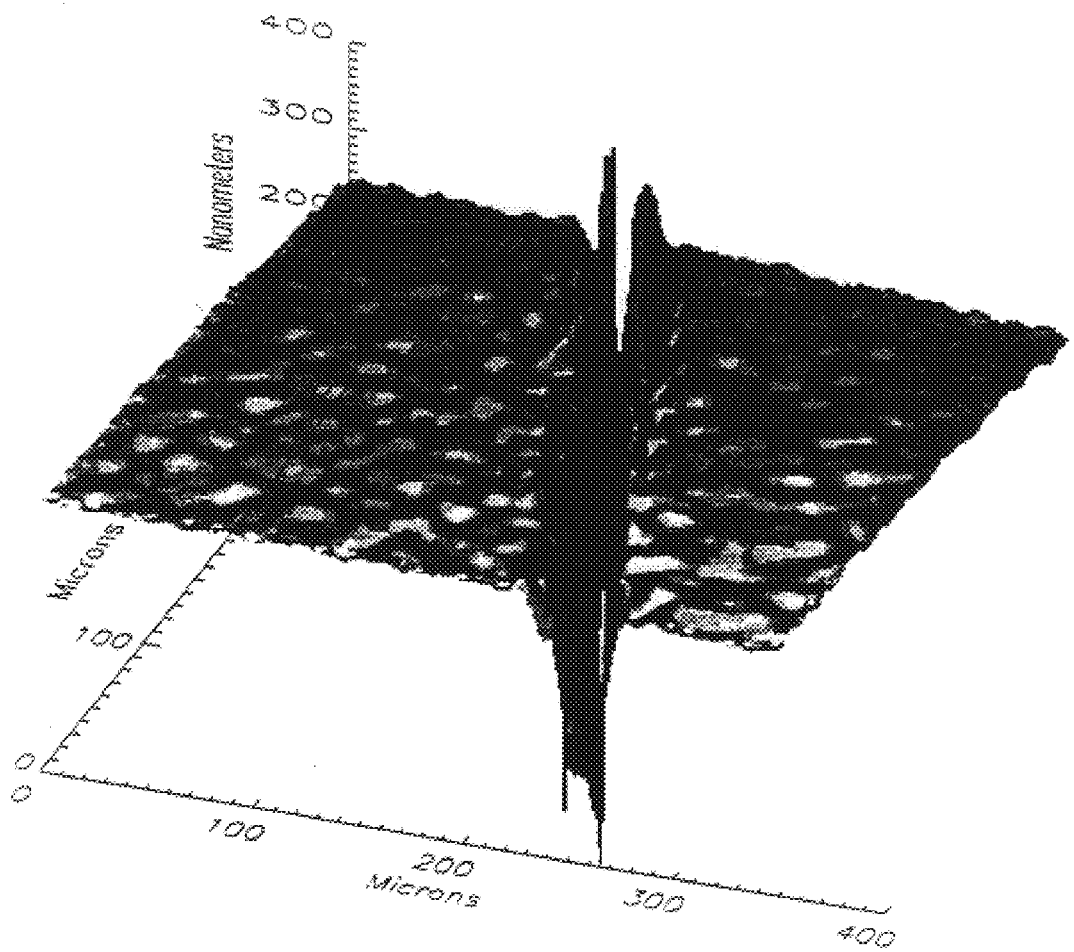
FIG. 6 illustrates a replay of hologram phase data from the hologram of FIG. 4.

FIG. 6 shows a replay of the phase data created by performing the described analysis on the data (hologram) from FIG. 5. Replaying the data as an actual hologram will require the creation of a diffraction grating in an optical crystal and illumination of the diffraction grating with laser light (or appropriately treated white light) at the correct angle. The data to be actually written to the optically sensitive crystal is calculated from the hologram data by adding a function $f(x,y,z_o)$ to each pixel $h(x,y,z_o)$ of the hologram data, where both functions are complex and:

$$f(x,y)=e^{ik\,\cos(\alpha)r}$$

and r is the square root of $x^2+y^2+z^2_o$.

The exponential function added above corresponds physically to adding a plane wave intersecting at angle α with the original object wave of the hologram. The function created by the sum is multiplied by its complex conjugate to form the absolute value intensity function, which is written to the light-sensitive crystal with the laser (it may also be possible to write only the intensity cross-term of the reference beam with the object, and drop the autocorrelation terms). The diffraction grating thus created in the light sensitive crystal can then be illuminated with laser light at angle α to replay the original hologram. If a crystal is used which has a temporary phase change or refractive index change when written with laser light, then by continuously writing new images from either instantaneously acquired or stored holograms, and illuminating each image with laser light from another laser (or appropriately treated white light) at the angle α, a 3-D motion picture or 3-D television image can be created. This is just one possible method and not the only possible method for writing the holographic image to an optically sensitive crystal and then replaying it.

Figure 7:
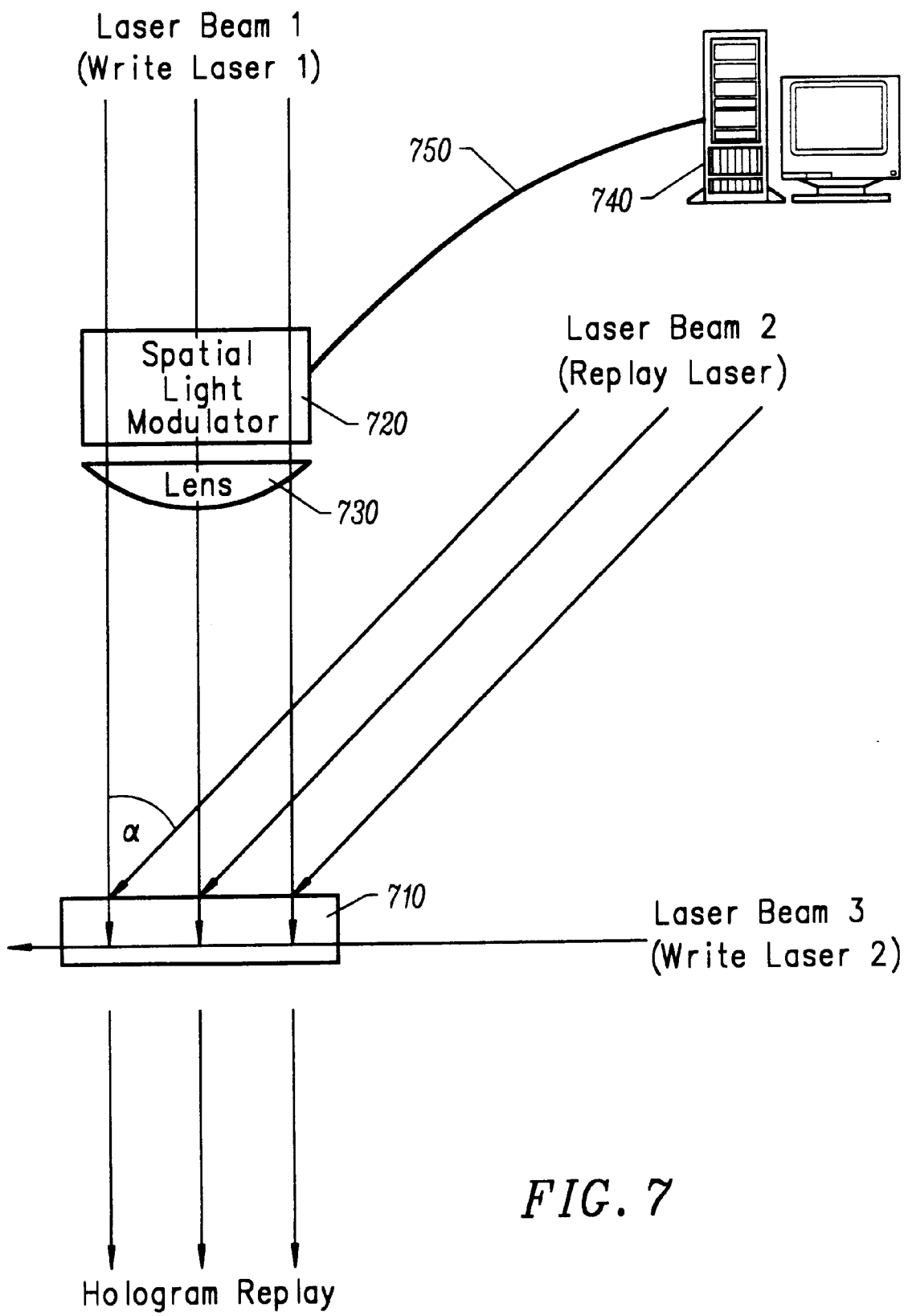
FIG. 7 illustrates a schematic view of a holographic replay system, representing an embodiment of the present invention.

FIG. 7 depicts a method for generating a motion picture or television using the invention. It can be appreciated that the hologram is written to the phase change or other optically active crystal by intersecting two laser beams in a phase change crystal 710. Laser Beam 1 is passed through a spatial light modulator 720 to modulate the hologram intensity pattern into it, created mathematically from the original hologram as described above. SLM 720 is controlled by a computer 740 via a data path 750. A focusing lens 730 focuses this pattern in the phase change crystal 710 at the intersection of Laser Beam 1 with Laser Beam 3, where the combined intensity of the two lasers is adequate to write the pattern to the crystal 710. After the pattern is written, Laser Beam 2, incident on the crystal 710 at angle α replays the original hologram.

Introduction to Lightwave Holography

In order that the hologram processing steps described herein can be more easily understood, it is useful briefly to review first the nature of off-axis holography. In an electron microscope, equipped with a highly coherent electron source, e.g. one using a field-emission electron gun, the electron beam that is incident on the specimen is, ideally, a plane wave. In practice, this can be achieved to a reasonable approximation if the illumination is spread over a large area. In this ideal case, the object in the microscope modifies the incident plane wave $\exp(i\bar{k}\,\bar{r})$ to the object wave $o(\bar{r})$, which is defined as:

$$o(\bar{r})=a(\bar{r})\cdot e^{i\phi(\bar{r})}. \qquad (1)$$

Both $a(\bar{r})$ and $\phi(\bar{r})$ are real functions and describe the object amplitude and the object phase, respectively. The vector $\bar{r}$ is a vector in the specimen plane, or the (x,y) plane. For reasons of simplicity, magnification factors and image rotations are ignored, so vectors in the image plane and the object plane coincide.

When recording the off-axis hologram, the object is, ideally, positioned exclusively on one side of the biprism. The biprism then overlaps the image wave (or object wave depending on the experimental set-up) with the reference wave, i.e. the wave on the other side of the biprism (Lichte, 1986; Joy et al., 1993; Möllenstedt & Düker, 1956; Tonomura, 1993). Ideally, the reference wave is a plane wave that does not go through any part of the specimen. This, however, is not an exclusive requirement and acceptable results may still be obtained if the reference wave goes through the specimen or is deformed by magnetic or electric fields. In the image plane below the biprism we find the image intensity $I(\bar{r})$ (Völkl & Lichte, 1990):

$$I(\bar{r})=1+A^2(\bar{r})+I^{inel}(\bar{r})+2\mu\cdot A(\bar{r})\cdot\cos\,(\Delta\bar{k}\cdot\bar{r}+\Phi(\bar{r})) \qquad (2)$$

where the additional term $I^{inel}(\bar{r})$ takes the inelastically scattered photons into account. The term $|\Delta\bar{k}|$ describes the spatial frequency of the holographic fringes. $A(\bar{r})$ and $\Phi(\bar{r})$ describe the image amplitude and phase, which are different from the object amplitude and phase due to the aberrations of the objective lens (and other sources of disturbances). The term $\mu$ describes the contrast of the interference fringes of no object is used, i.e. A=1, and $I^{inel}$ and $\Phi$ are zero.

Figure 8:
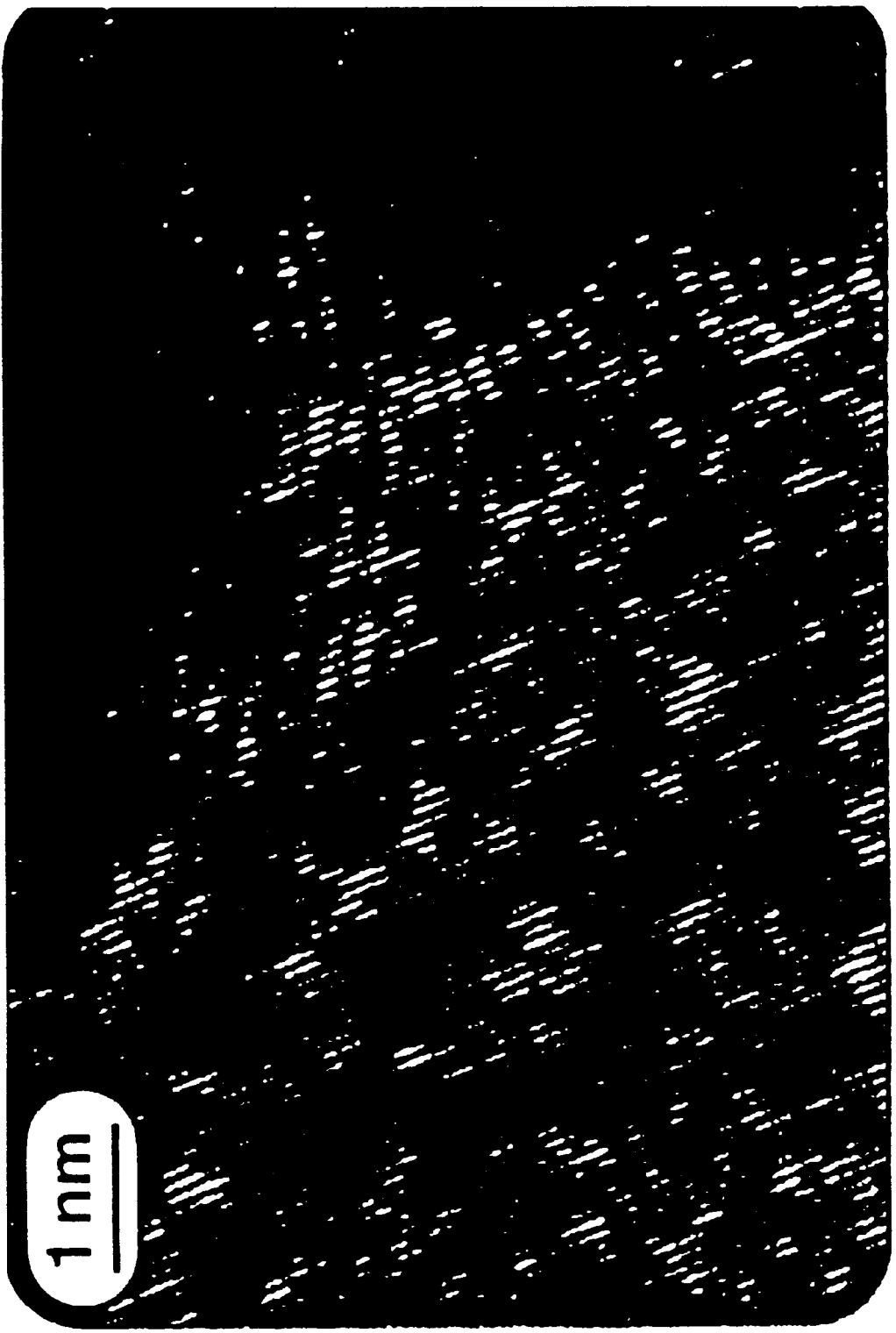
FIG. 8 illustrates a selected area of a hologram of gold particles on an amorphous carbon film, representing an embodiment of the present invention.

In FIG. 8, a small area selected from a hologram of gold particles on an amorphous carbon foil is displayed to show the interference fringes. They run from the top left to the bottom right corner of the image. In order to extract the information about the (complex) image wave, and from that the amplitude and phase, a Fourier transform (FT) of the image intensity I($\bar{r}$) is performed and we obtain $$FT\{I(\bar{r})\} = FT\{1 + I^{inel} + A^2(\bar{r})\} + \qquad (3)$$

$$\delta(\Delta\vec{k} - \vec{q}) * FT\{A(\bar{r}) \cdot e^{i\Phi(\bar{r})}\} + \delta(\Delta\vec{k} + \vec{q}) * FT\{A(\bar{r}) \cdot e^{-i\Phi(\bar{r})}\}$$

where * denotes convolution.

Figure 9:
FIG. 9 illustrates a selected area of the modulus of the Fourier transform of the hologram in FIG. 8 (center area: the autocorrelation; left and right area: the sidebands), representing an embodiment of the present invention.

The Fourier transform of the hologram of FIG. 8 is displayed in FIG. 9. The central area is known as the 'autocorrelation', which corresponds to the Fourier transform of a conventional image. The interesting features in this image are the 'sidebands' that look like ears around the autocorrelation. A closer look shows that there is, for example, no centrosymmetry with respect to the center of the sideband: opposite beams do not have the same intensity; this is a mathematical necessity).

The last two lines of Eq.(3) correspond to the two sidebands in FIG. 9. By isolating one of the sidebands from the Fourier transform we retain the Fourier transform of the complex image wave. Ignoring chromatic aberrations, the Fourier transform of the complex image wave corresponds to the Fourier transform of the complex object wave in the following way:

$$FT\{A(\bar{r}) \cdot e^{i\Phi(\bar{r})}\} = FT\{a(\bar{r}) \cdot e^{i\phi(\bar{r})}\} \cdot e^{i\chi(\bar{q})} \qquad (4)$$

where the term $\chi(\bar{q})$ describes the isoplanatic wave aberrations. Here, $\bar{q}$ is a two-dimensional vector in the Fourier space (or reciprocal space), i.e. the back focal plane of the objective lens. It is obvious from this equation that if $\chi(\bar{q})$ is known, this information can be used to cancel the influence of $\chi(\bar{q})$, which results in an improvement in the point resolution (Tonomura et al., 1979; Fu et al., 1991). This is desirable, as the interpretation of high-resolution crystal structure images then becomes more intuitive.

Figure 10B:
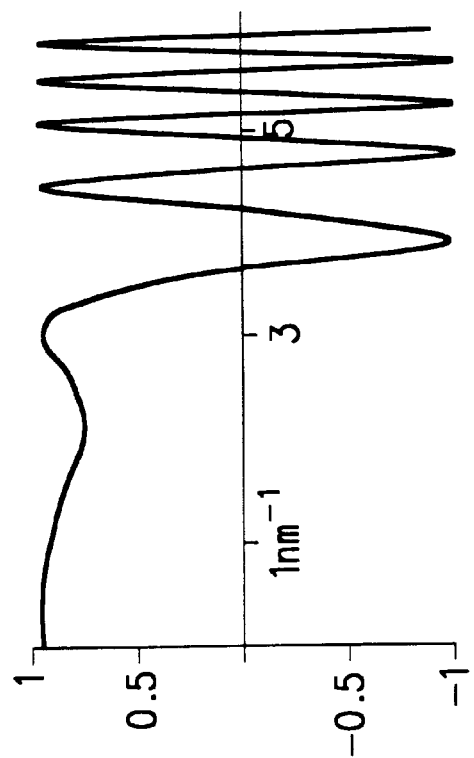
FIG. 10B illustrates a holography special transfer function at Gabor focus, representing an embodiment of the present invention.
Figure 10A:
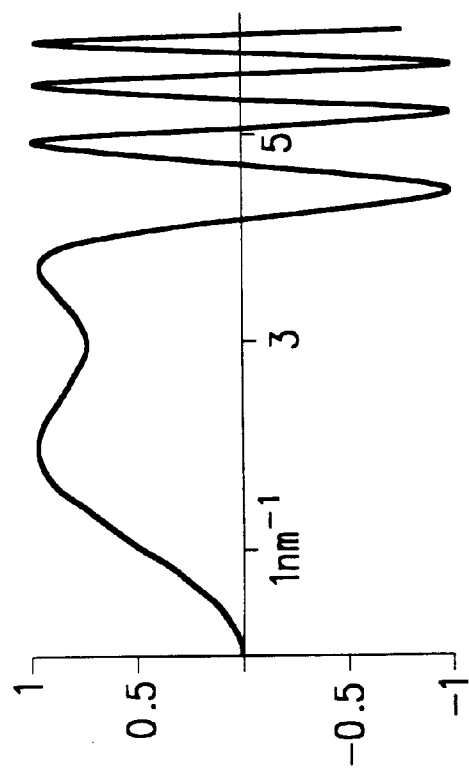
FIG. 10A illustrates a contrast transfer function at Scherzer focus.

Besides the possible improvements of the point resolution of a microscope, another important feature of lightwave holography is the direct accessibility of the image phase. In contrast to the conventional contrast transfer function which is a sin-function (Reimer, 1989) and displaced in FIG. 10A, the transfer function of the object phase into the image phase is described by the cos-function. This transfer function is displayed in FIG. 10B. The advantage of the cos-type transfer function is that the large area contrast (details of size>1 nm) is not decreased and, apart from a slightly degraded point resolution, the total amount of information is higher in the image phase than in the image intensity at Gabor focus (Weierstall, 1989; Lichte, 1991). This is one of the reasons why a direct display of the image phase is preferable over the image intensity in some cases.

The Extended Fourier Transform

In order to evaluate holograms in a computer, discrete Fourier optics is conventionally used. Although the discrete Fourier transform of an image contains the same information as the original image, the conventional discrete Fourier transform is not the ideal tool to perform this task.

To illustrate this, let us consider a discrete image of size N×N pixels which is readily obtained from a slow-scan CCD camera. Suppose the size of one pixel of the CCD camera has the dimension d×d, and the distance between neighboring pixels is also d. The image function I(x,y) is recorded at each pixel, and has the value:

$$I_{mn} = \frac{1}{d^2} \int_{(m-1)d}^{md} \int_{(n-1)d}^{nd} I(x,y) dx dy, \qquad (5)$$

with m, n=1, ..., N. $I_{m,n}$ is slightly different from the values of the function I(x,y) at the center of the pixel ((m−½)d, (n−½)d)) due to the integration over the area of the pixel. This effect together with others contributes to the MTF of the CCD camera. For this discussion, we will assume that the MTF has been corrected for and therefore I((m−½)d, (n−½)d))=$I_{n,m}$. We also assume, for the moment, that I(x,y) has the form:

$$I(x,y) = \cos[2\pi(xu+yv)] \qquad (6)$$

for $0 \leq x,y \leq Nd$, and is 0 elsewhere. The digitized image $I_{m,n}$ is:

$$I_{m,n} = \cos\{2\pi[(m-½)ud + (n-½)vd]\} \qquad (7)$$

for $0 \leq m,n \leq N$, and is 0 elsewhere. We define the number of pixels needed to cover $2\pi$ in the direction perpendicular to the fringes defined in Eq.(7) as the sampling rate s for the spatial frequency $$\sqrt{u^2 + v^2}:$$

$$s := \frac{1}{d\sqrt{u^2 + v^2}} \qquad (8)$$

Figure 11:
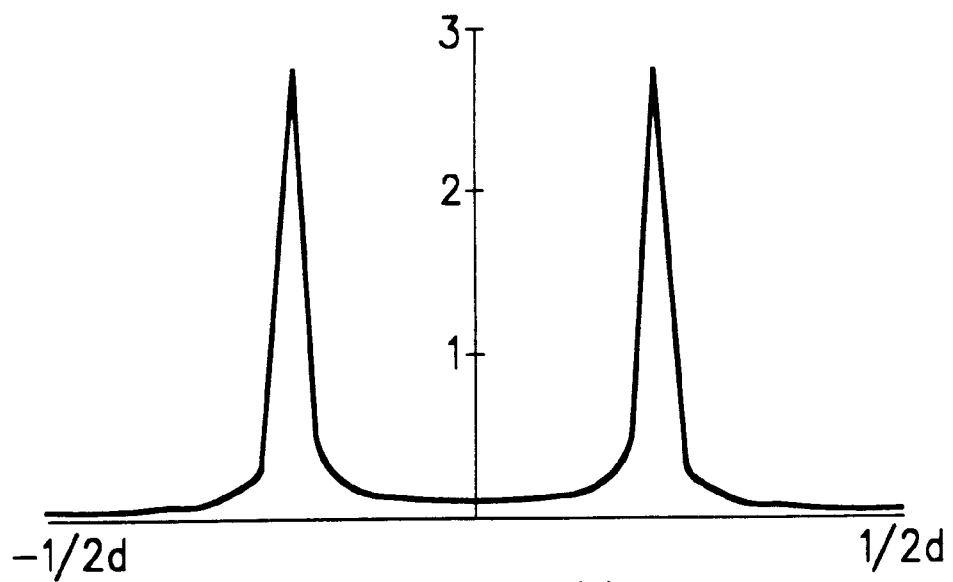
FIG. 11 illustrates a modulus of discrete Fourier transform of cos-pattern sampled with 32 points at sampling rate s=4.66 (number of display points in discrete Fourier transform is 32), representing an embodiment of the present invention.

It is not required that this number of pixels be an integer. The sampling theorem states that if the image function I(x,y) is sampled such that no spatial frequency of the image is sampled below the Nyquist limit [12], then the image function is uniquely defined within the area of the CCD camera. In other words, if all the spatial frequencies of the image function I(x,y) are sampled with $s \geq 2$, then the information $I_{m,n}$ on I(x,y) within the area of the CCD camera is complete. Therefore, it should be a question of display only, if I(x,y) is displayed with, for example, 124×124 or 13789×13789 sampling points (i.e., display points), both in real space and in Fourier space. The discrete Fourier transform $FT^d\{\ldots\}$ is defined as:

$$FT^d(\ldots) = \frac{1}{N} \sum_{m,n=1}^{N} (\ldots) e^{-2\pi i(km+\epsilon n)/N} \qquad (9)$$

where $N/2 \leq k, l \leq N/2 - 1$. FIG. 11 shows the modulus of the Fourier transform of Eq.(7) $FT^d\{I_m\}$ in one dimension and N=32. The motivation for an extended Fourier algorithm originally came from the surprising difference in the display between the modulus of $FT^d\{I_m\}$ and the display of the modulus of the analytic Fourier transform of Eq.(6) $FT^a\{I(x)\}$. The analytic Fourier transform FTa is defined as:

$$FT^a\{\ldots\} = \iint_{-\infty}^{\infty} \{\ldots\} e^{2\pi i(xu+yu)} dx dy \qquad (10)$$

$$= \iint_{0}^{Nd} \{\ldots\} e^{2\pi i(xu+yu)} dx dy.$$

Figure 12:
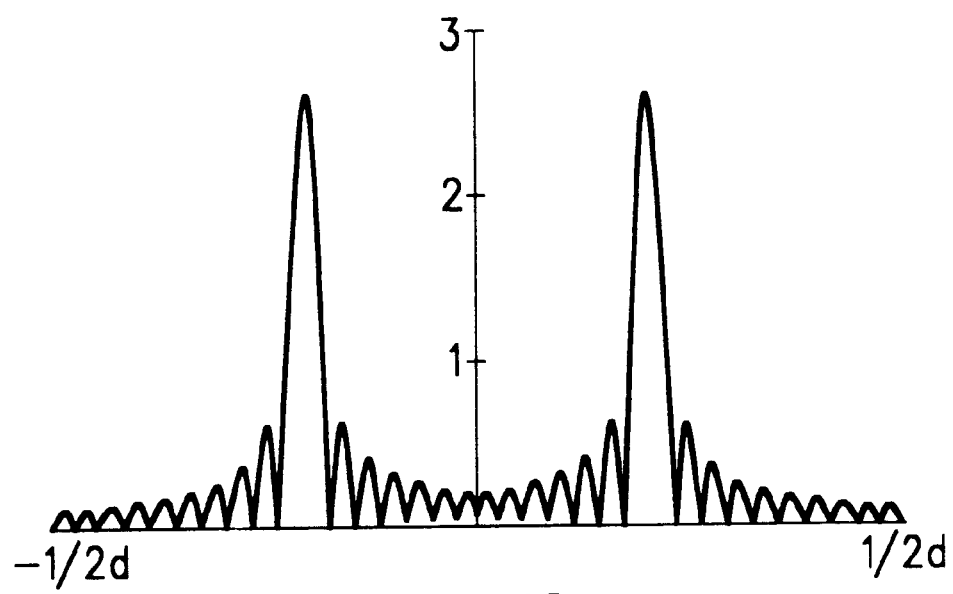
FIG. 12 illustrates a modulus of analytic Fourier transform of cos-pattern according to Eq. (6) (cos-pattern is limited to same area (in real space) as data from FIG. 11 and none of the details in this figure can be found in FIG. 11), representing an embodiment of the present invention.

The modulus of $FT^a\{I(x)\}$ is displayed in FIG. 12. In comparing FIGS. 11 and 12, it is clear that none of the details visible in FIG. 12 are found in FIG. 11. Also, the $FT^a$ extends to infinity in Fourier space, whereas the $FT^d$ does not extend beyond the well known Nyquist limit at 1/(2d).

The (discrete) extended Fourier transform EFT is defined as follows:

$$EFT\{\ldots\} = \frac{1}{N}\sum_{m,n=1}^{N}\{\ldots\}\times e^{-2\pi i[(k+\Delta k)m+(l+\Delta l)n]/(N\tau)}, \quad (11)$$

with $-1\leq\Delta k$, $\Delta l\leq 1$; $\pi/2\leq k,l\leq N$ $\pi/2-1$. The inverse extended Fourier transform is defined as:

$$EFT\{\ldots\} = \frac{1}{N\tau^2}\sum_{k,l=-N\tau/2}^{N\tau/2-1}\{\ldots\}\times e^{2\pi i[(k+\Delta k)m+(l+\Delta l)n]/(N\tau)}. \quad (12)$$

The new variables $\Delta k$, $\Delta$ and $\pi$ permit a change in the display in Fourier space as well as the number of display points. Note that for $\Delta k$, $\Delta l=0$ and $\pi=1$, $EFT=FT^d$.

The Effect of $\pi$

Figure 13:
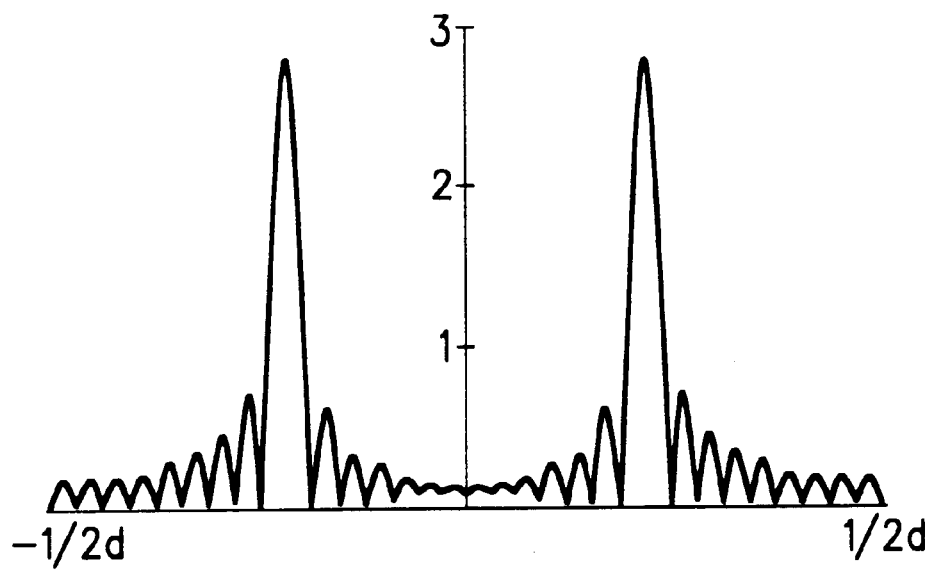
FIG. 13 illustrates a modulus of extended Fourier transform of cos-pattern (original set of display points was 32 as in FIG. 11; choosing parameter $\pi$ to be 16, number of display points in extended Fourier transform is 512 and shows same details as visible in analytic Fourier transform), representing an embodiment of the present invention.

The effect of $\pi$ can be seen from FIG. 13. Using $\pi=16$ and $\Delta k, \Delta l=0$, there are now $N\Delta=512$ points to display in Fourier space instead of $N=32$ points as in FIG. 11. Obviously, the details visible in the analytic Fourier transform (FIG. 12) appear in the discrete EFT too. But again, both the EFT (for $\pi\geq 1$) and the $FT^d$ contain the same information. There are still two differences in the display of the modulus of the analytic and the modulus of the extended Fourier transform. First the Nyquist limit still holds for the extended Fourier transform and no spatial frequencies show up beyond the Nyquist limit. Second, the limited image area causes higher frequencies in Fourier space, which are reflected back at the Nyquist limit and cause differences such as the disappearance of the very fine details visible in the $FT^a$.

The Effect of $\Delta k$

Figure 14:
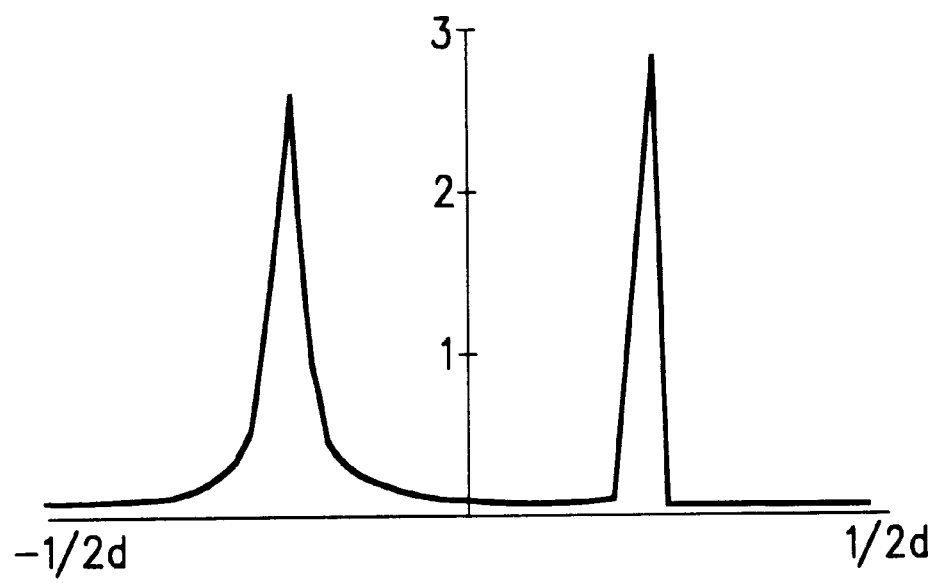
FIG. 14 illustrates the results of an extended Fourier algorithm which allows display of conventional discrete Fourier transform but shifted by fraction of pixel (again, same cos-pattern as for FIG. 11 is used; choosing true values for $\Delta k$ (and $\Delta l$ in two dimensions), it is possible to display at least one peak in Fourier space such that it falls directly on display point; in this case, sidelobes disappear (see right peak)), representing an embodiment of the present invention.

The effect of $\Delta k$ in $EFT\{I_m\}$ is displayed in FIG. 14 for the special case $\Delta k=0.133$ and $\pi=1$. In comparison to FIG. 11, the right of the two peaks now coincides exactly with a pixel (or display point) in Fourier space. This causes the sidelobes, as visible in FIG. 11, to disappear.

This shifting of the display points in Fourier space is very important for off-axis lightwave holography, especially for the reconstruction of the image amplitude (under most circumstances, the wedge in the reconstructed phase, caused by the center of the sideband being off a display point, can be compensated easily). The effect of the center of the sideband being off a display point is to cause noise in the reconstructed amplitude.

Figure 15:
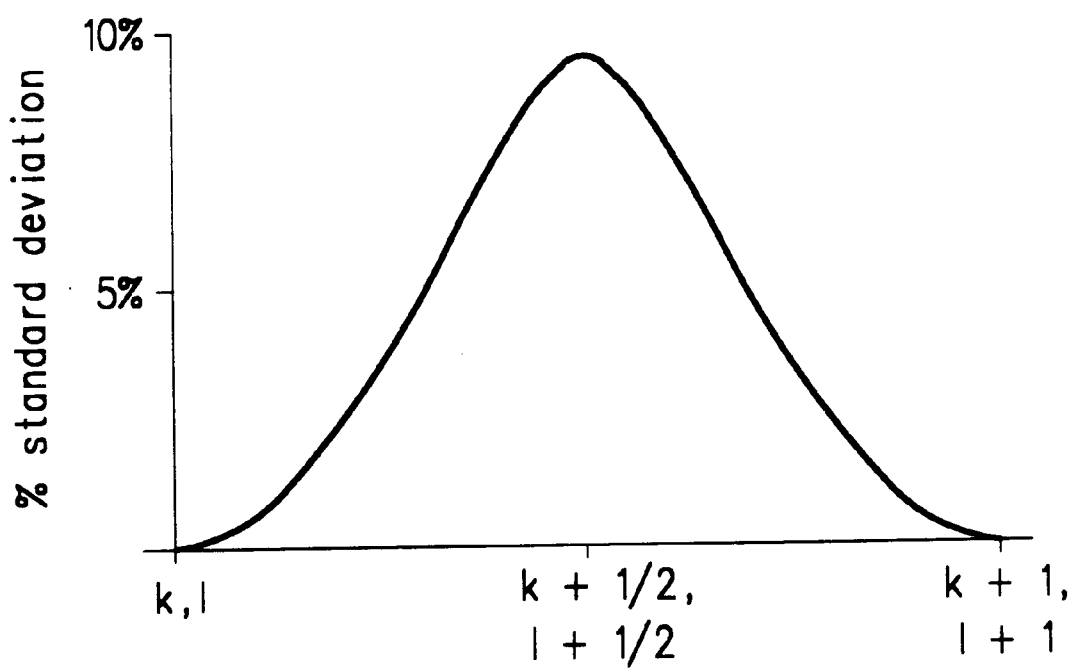
FIG. 15 illustrates that reconstructing amplitude from a sideband that is not truly centered causes artifacts in image (the worst situation is when center of the sideband falls exactly in between display points in Fourier space), representing an embodiment of the present invention.

We can demonstrate the effect of the center of the sideband being actually off center of a display point in Fourier space on the reconstruction. To do this, we generate an empty hologram in the computer (image size 512×512) such that the sideband falls exactly on the display point (k,l) in Fourier space. In this case, the reconstructed amplitude is flat and shows a mean standard deviation of effectively 0%. A slight change in the generation, i.e. decreasing the sampling rate s, causes the center of the sideband to fall between the display points (k,l) and (k+1, l+1). Again, the mean standard deviation is computed, and we continue to decrease the sampling rate until the center of the sideband falls on the display point (k+1, l+1). The result of this simulation is displayed in FIG. 15. In the worst case, when the center of the sideband is found at (k+½, l+½), the mean standard deviation in the reconstructed amplitude reaches 10%.

Based on the above observations, the following reconstruction procedure can be advantageous:
(1) Select area hologram that does not show object contributions (if possible).
(2) Apply Hanning window to this area (or all of hologram).
(3) Perform $FT^d$ and extract information about exact position of sideband. This defines $\Delta k$ and $\Delta l$ for the extended Fourier algorithm.
(4) Apply EFT using the information on $\Delta k$ and $\Delta l$. Use $\pi=1$.
(5) Isolate sideband, which is now perfectly centered.
(6) Perform inverse $FT^d$.
(7) Extract amplitude and phase.

Example. Apply Hanning window and perform $FT^d$. Position of sideband is, lets say, (134.62, 172.31), using W. J. de Ruigter et al. in Proc. 10th Pfefferkorn Conf. Scanning Microsc. Suppl. 6 (1992) 347; $\rightarrow\Delta k=0.62$ and $\Delta l=0.31$. Use these data together with $\pi=1$ and perform EFT of hologram. The sideband is now centered on a display point and artifacts are reduced in the reconstructed amplitude.

Practical Applications of the Invention

A practical application of the present invention which has value within the technological arts is holographic interferometry for computer assisted measurements. Further, the present invention is useful in conjunction with Holographic Television or Motion Pictures ("HoloVision") such as are used for the purpose of entertainment, or for the purpose of training, or the like. Nanovisualization and measurement in three dimensions for light wave holographic microscopy and electron holographic microscopy are expected to be major scientific applications. There are virtually innumerable uses for the present invention, all of which need not be detailed here.

Advantages of the Invention

A direct-to-digital hologram system, representing an embodiment of the invention is cost effective and advantageous for at least the following reasons. The combination of high resolution CCD, and optical techniques that reduce the density of the interference pattern (fringes) to a density that the CCD can record, combined with the Fourier transform techniques developed for interferometry and by Dr. Voelkl for electron holography, allow the electronic recording and replay of holograms.

All the disclosed embodiments of the invention described herein can be realized and practiced without undue experimentation. Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept. Accordingly, it will be appreciated by those skilled in the art that the invention may be practiced otherwise than as specifically described herein.

For example, the individual components need not be formed in the disclosed shapes, or assembled in the disclosed configuration, but could be provided in virtually any shape, and assembled in virtually any configuration. Further, the individual components need not be fabricated from the disclosed materials, but could be fabricated from virtually any suitable materials. Further, although the recordation equipment described herein is a physically separate module, it will be manifest that the recordation equipment may be integrated into the apparatus with which it is associated. Furthermore, all the disclosed elements and features of each disclosed embodiment can be combined with, or substituted for, the disclosed elements and features of every other disclosed embodiment except where such elements or features are mutually exclusive.

It is intended that the appended claims cover all such additions, modifications and rearrangements. Expedient embodiments of the present invention are differentiated by the appended subclaims.

REFERENCES

1. D. Gabor, Proc. Roy. Soc. London Ser. A A197, 459 (1949).
2. E. Leith and J. Upatnieks, J. Opt. Soc. Am. 52, 1123 (1962).
3. E. Leith and J. Upatnieks, J. Opt. Soc. Am. 53, 1377 (1963).
4. J. B. Develis and G. O. Reynolds, Theory and Application of Holography, Addison-Wesley, Reading, Mass., 1967.
5. L. O. Heflinger, R. F. Wuerker, and R. E. Brooks, J. Appl. Phys. 37, 642 (1966).
6. F. C. Jahoda, R. A. Jeffries, and G. A. Sawyer, Appl. Opt. 6, 1407 (1967);
7. F. C. Jahoda and R. E. Siemon, Holographic Interferometry Cookbook, LA-5058-MS Informal Report UC-37, Los Alamos Scientific Laboratory, Los Alamos, N. Mex., (1972).
8. M. Kujawinski, in Interferogram Analysis; Digital Fringe Pattern Measurement Techniques, (edited by D. W. Robinson and G. T. Reid), IOP Publishing Ltd., Bristol, England, 1993.
9. K. Creath and T. Kreis, in Holographic Interferometry: Principals and Methods, (edited by K. Rastogi), Springer-Verlag, New York, N.Y., 1994.
10. E. Voelkl, L. F. Allard, and B. Frost, J. Microscopy 180, pt. 1, October, 1995, pp. 39–50.
11. E. Voelkl, and L. F. Allard, A. Datye, B. Frost, Ultramicroscopy 58, (1995), pp. 97–103.
12. E. Voelkl and L. F. Allard, ICEM-13 (13'th International Conference on Electron Microscopy), Jul. 17–22, 1994, Paris, France, Proceedings, p. 287.
13. The Electrical Engineering Handbook, CRC Press, (Richard C. Dorf et al. eds., 1993).
14. Handbook of Optics, Volumes I–II, 2nd ed., McGraw Hill Inc., (Michael Bass et al. eds., 1995).

What is claimed is:

1. An apparatus to record an off-axis hologram, comprising: a laser; a beamsplitter optically coupled to said laser; a reference beam mirror optically coupled to said beamsplitter; an object optically coupled to said beamsplitter, a focusing lens optically coupled to both said reference beam mirror and said object; and a digital recorder optically coupled to said focusing lens,
   wherein a reference beam is incident upon said reference beam mirror at a non-normal angle, said reference beam and an object beam are focused by said focusing lens at a focal plane of said digital recorder to form an off-axis hologram, and said object beam and said reference beam constitute a plurality of simultaneous reference and object waves.

2. The apparatus of claim 1, wherein said digital recorder includes a CCD camera.

3. The apparatus of claim 1, further comprising a beam expander/spatial filter optically coupled between said laser and said beamsplitter.

4. The apparatus of claim 1, wherein said beamsplitter, said reference beam mirror, and said digital recorder define a Michelson geometry.

5. The apparatus of claim 1, further comprising a digital storage medium connected to said digital recorder.

6. A method of recording an off-axis hologram, comprising:
   splitting a laser beam into a reference beam and an object beam;
   reflecting said reference beam from a reference beam mirror at a non-normal angle;
   reflecting said object beam from an object;
   focusing said reference beam and said object beam in at a focal plane of a digital recorder to form an off-axis hologram and record object wave in focus phase and amplitude;
   digitally recording said off-axis hologram; and
   transforming said off-axis hologram in accordance with a Fourier transform to obtain a set of results.

7. The method of claim 6, wherein digitally recording includes detecting said reference beam and said object beam with a CCD camera.

8. The method of claim 6, further comprising storing said off-axis hologram as digital data.

9. The method of claim 6, further comprising replaying said off-axis hologram.

10. The method of claim 6, further comprising transmitting said off-axis hologram.

11. The method of claim 6, wherein transforming said off-axis hologram in accordance with said Fourier transform to obtain said set of results includes Fourier transform analysis of a spatially low-frequency heterodyne hologram.

12. The method of claim 6, wherein transforming said off-axis hologram in accordance with said Fourier transform to obtain said set of results includes Fourier transform analysis of a side-band hologram to calculate phase and amplitude for a plurality of pixels.

13. The method of claim 6, wherein transforming said off-axis hologram in accordance with said Fourier transform to obtain said set of results includes transforming a plurality of axes in Fourier space to sit on top of a heterodyne carrier frequency.

14. The method of claim 13, wherein transforming said off-axis hologram in accordance with said Fourier transform to obtain said set of results includes applying a digital filter to cut off a plurality of signals around an original origin, after transforming a plurality of axes in Fourier space to sit on top of a heterodyne carrier frequency.

15. The method of claim 14, wherein transforming said digital image in accordance with said Fourier transform to obtain said set of results includes performing an inverse Fourier transform, after applying a digital filter to cut off a plurality of signals around an original origin.

16. An off-axis hologram prepared by a process comprising the steps of:
   splitting a laser beam into a reference beam and an object beam;
   reflecting said reference beam from a reference beam mirror at a non-normal angle;
   reflecting said object beam from an object;
   focusing said reference beam and said object beam at a focal plane of a digital recorder to form said off-axis hologram;
   digitally recording said off-axis hologram; and
   transforming said off-axis hologram in accordance with a Fourier transform to obtain a set of results.

17. The off axis-hologram of claim 16, wherein said off-axis hologram is generated using an extended Fourier transform.

18. A method of recording an off-axis hologram comprising:
- providing
  - i) a digital recorder;
  - ii) a light source;
  - iii) a beamsplitter;
  - iv) a reference beam mirror;
  - v) a digital memory connected to said digital recorder;
- illuminating said object with photons from said light source;
- transmitting reflectance from said object to said digital recorder;
- illuminating said reference beam mirror at a non-normal angle of incidence with photons from said light source;
- focusing reflectance from both said object and said reference beam mirror at a focal plane of said digital recorder;
- recording said reflectance with said digital recorder to form an off-axis hologram;
- storing said off-axis hologram with said digital memory; and
- transforming said off-axis hologram in accordance with a Fourier transform to obtain a set of results.

19. The method of claim 18, further comprising transmitting and receiving said set of results.

20. The method of claim 19, further comprising replaying said off-axis hologram.

* * * * *